United States Patent
Satoh et al.

(10) Patent No.: US 9,050,809 B2
(45) Date of Patent: Jun. 9, 2015

(54) LIQUID DISCHARGE RECORDING APPARATUS AND METHOD FOR RECOVERING LIQUID

(71) Applicant: Brother Kogyo Kabushiki Kaisha, Nagoya-shi, Aichi-ken (JP)

(72) Inventors: Noriaki Satoh, Nagoya (JP); Junichiro Sugimoto, Nagoya (JP); Akihiko Taniguchi, Kakamigahara (JP); Ayako Ohishi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/493,457

(22) Filed: Sep. 23, 2014

(65) Prior Publication Data

US 2015/0091978 A1 Apr. 2, 2015

(30) Foreign Application Priority Data

Sep. 30, 2013 (JP) .................................. 2013-205688

(51) Int. Cl.
*B41J 2/17* (2006.01)
*B41J 2/165* (2006.01)

(52) U.S. Cl.
CPC .................................. *B41J 2/16517* (2013.01)

(58) Field of Classification Search
CPC ........ C09D 11/40; C09D 11/38; C09D 11/30; C09D 11/32; C09D 17/001; C07C 255/41; B41J 2/2107; B41J 2/17; B41J 2/185
USPC .................. 347/28, 30, 31, 36, 89, 90, 95
See application file for complete search history.

(56) References Cited

U.S. PATENT DOCUMENTS

| | | | |
|---|---|---|---|
| 8,757,776 B2 * | 6/2014 | Yamakami et al. | 347/54 |
| 2005/0206701 A1 | 9/2005 | Komatsu et al. | |
| 2006/0109322 A1 | 5/2006 | Nakazawa et al. | |
| 2009/0027443 A1 | 1/2009 | Komatsu et al. | |
| 2009/0027470 A1 | 1/2009 | Komatsu et al. | |
| 2009/0027471 A1 | 1/2009 | Komatsu et al. | |
| 2009/0258203 A1 | 10/2009 | Aoyama et al. | |
| 2011/0007111 A1 | 1/2011 | Komatsu et al. | |
| 2011/0012956 A1 | 1/2011 | Kagata et al. | |

FOREIGN PATENT DOCUMENTS

| | | |
|---|---|---|
| EP | 2738004 A1 | 6/2014 |
| JP | 2003-128969 A | 5/2003 |
| JP | 2003-147243 A | 5/2003 |
| JP | 2005-014423 A | 1/2005 |
| JP | 2005-014424 A | 1/2005 |
| JP | 2006-168351 A | 6/2006 |
| JP | 2013-052519 A | 3/2013 |
| WO | 2004/080723 A1 | 9/2004 |

OTHER PUBLICATIONS

Feb. 10, 2005—(EP) Extended Search Report—App 14184979.4.

* cited by examiner

*Primary Examiner* — Thinh Nguyen
(74) *Attorney, Agent, or Firm* — Banner & Witcoff, Ltd.

(57) ABSTRACT

A liquid discharge recording apparatus includes a first liquid containing first 1,2-alkanediol; a liquid discharge head configured to discharge the first liquid; a second liquid containing second 1,2-alkanediol of which vapor pressure is lower than that of the first 1,2-alkanediol; and an absorber which contains the second liquid and which is configured to absorb the first liquid exited from the liquid discharge head.

19 Claims, 3 Drawing Sheets

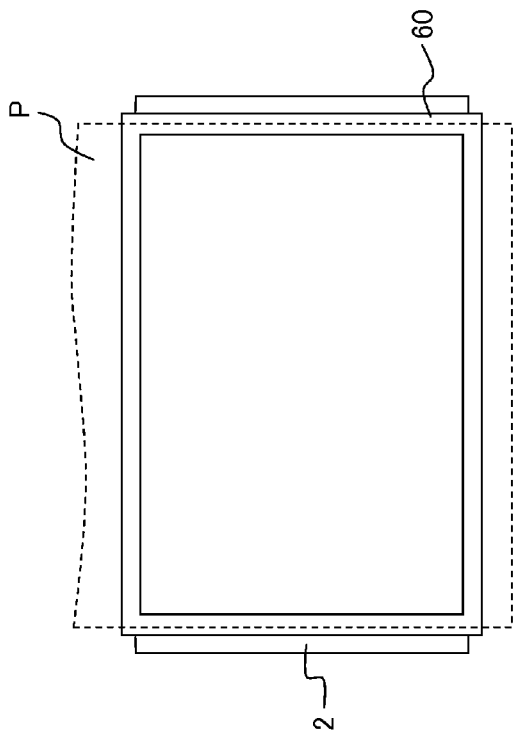
Fig. 3A
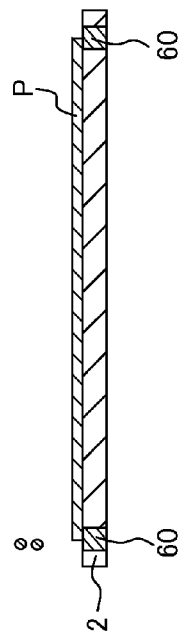
Fig. 3B  SCANNING DIRECTION

LIQUID DISCHARGE RECORDING APPARATUS AND METHOD FOR RECOVERING LIQUID

CROSS REFERENCE TO RELATED APPLICATION

The present application claims priority from Japanese Patent Application No. 2013-205688 filed on Sep. 30, 2013, the disclosure of which is incorporated herein by reference in its entirety.

BACKGROUND OF THE INVENTION

1. Field of the Invention

The present invention relates to a liquid discharge recording apparatus and a method for recovering liquid.

2. Description of the Related Art

Conventionally, a water-based ink for ink-jet recording (hereinafter referred to as a "water-based ink" or an "ink" in some cases) has been using, as a solvent, a volatile organic solvent (see, for example, Japanese Patent Application Laid-open No. 2003-147243). In the recent years, however, there is a demand for the water-based ink to reduce the generation of any VOC (Volatile Organic Compounds), in view of protection of the global environment. For this purpose, there are proposed measurements such as reducing the blending amount (content) of the volatile organic solvent in the water-based ink, as using a water-soluble organic solvent which is non-volatile with respect to the water-based ink, etc., so as to reduce the generation of the VOC (see, for example, Japanese Patent Application Laid-open No. 2003-128969).

In the recent years, there is an increased demand for further reducing the generation of VOC as the consumption of ink is increased due to, for example, the improvement in recording speed. On the other hand, in a case that a non-volatile organic solvent is added to a water-based ink as the countermeasure against the VOC, the quick-drying property during recording and the spreading into a recording medium such as a recording paper (recording sheet), etc., are not sufficient, making it difficult to satisfy the property or performance as a water-based ink adapted for a high-speed recording. In view of the situation described above, there is a demand for a liquid discharge recording apparatus, such as an ink-jet recording apparatus, which is adapted to the high-speed recording as well as capable of further reducing the generation of VOC more than the conventional technique.

An object of the present teaching is to provide a liquid discharge recording apparatus and a method for recovering a liquid which are capable of reducing the generation of VOC.

SUMMARY OF THE INVENTION

According to a first aspect of the present teaching, there is provided a liquid discharge recording apparatus including:

a first liquid containing first 1,2-alkanediol;

a liquid discharge head configured to discharge the first liquid;

a second liquid containing second 1,2-alkanediol of which vapor pressure is lower than that of the first 1,2-alkanediol; and an absorber which contains the second liquid and which is configured to absorb the first liquid exited from the liquid discharge head.

According to a second aspect of the present teaching, there is provided a liquid-recovery method for recovering a liquid in a liquid discharge recording apparatus, the method including:

causing a first liquid containing first 1,2-alkanediol to exit from a liquid discharge head of the liquid discharge recording apparatus; and recovering the first liquid by absorbing the first liquid exited from the liquid discharge head with an absorber which is provided in the liquid discharge recording apparatus and which contains a second liquid containing second 1,2-alkanediol having lower vapor pressure than that of the first 1,2-alkanediol.

BRIEF DESCRIPTION OF THE DRAWINGS

FIG. 3A is a plane view of a platen and a platen absorber of the liquid discharge recording apparatus shown in FIG. 1, and FIG. 3B is a cross-sectional view of the platen and the platen absorber in the vertical plane including the scanning direction when the liquid discharge recording apparatus shown in FIG. 1 performs liquid recovery operation.

DESCRIPTION OF THE PREFERRED EMBODIMENTS

Figure 1:
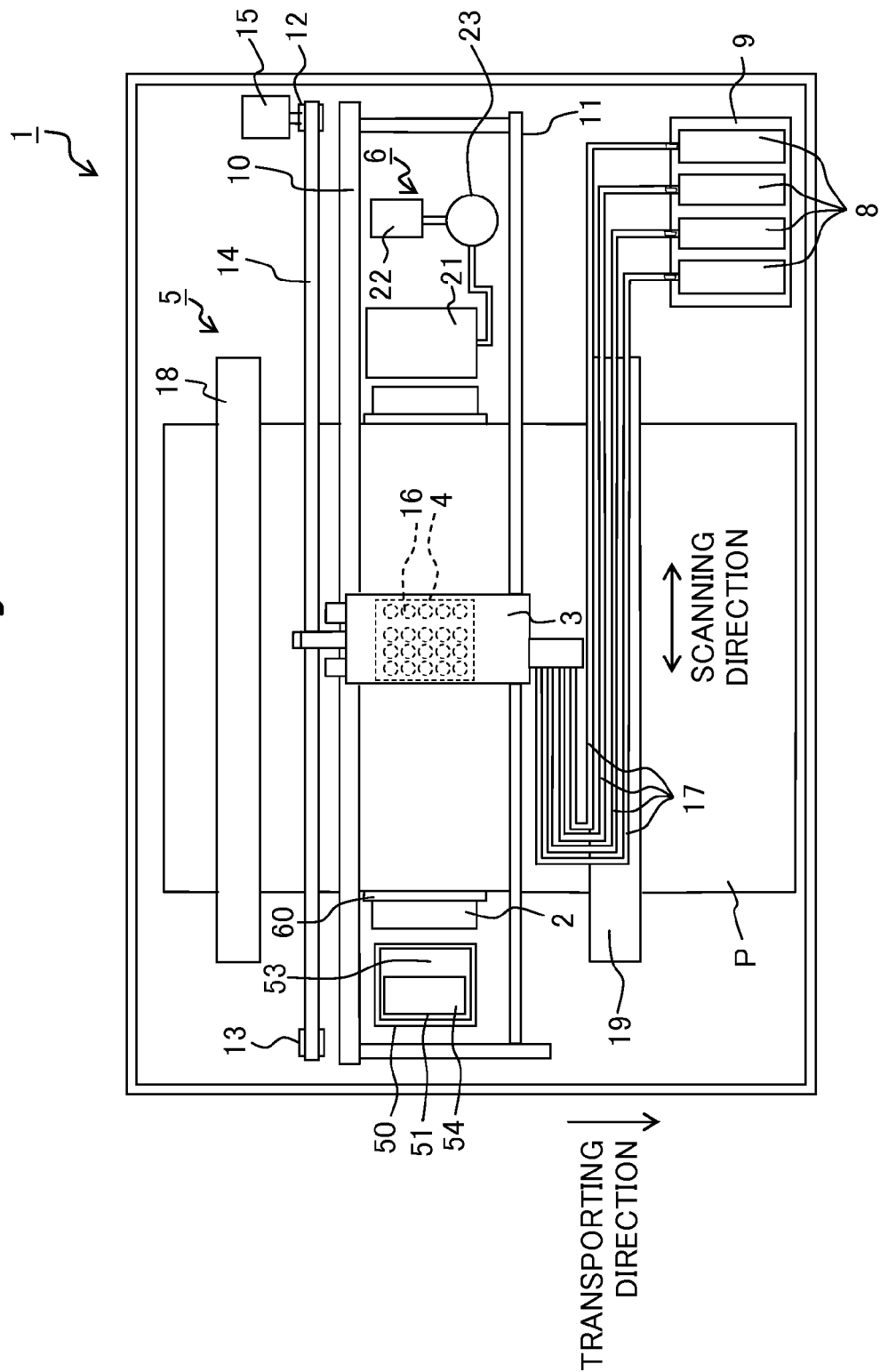
FIG. 1 is a schematic plane view showing the configuration of an example of a liquid discharge recording apparatus of the present teaching.

A liquid discharge recording apparatus of the present teaching includes a first liquid containing first 1,2-alkanediol, a liquid discharge head configured to discharge the first liquid, and an absorber which contains a second liquid containing second 1,2-alkanediol and which is configured to absorb the first liquid exited from the liquid discharge head. The vapor pressure of the second 1,2-alkanediol is lower than the vapor pressure of the first 1,2-alkanediol. In the following description of the present specification, the "1,2-alkanediol" is referred to also as "1,2-diol" in some cases. Further, in the specification, "the first liquid exited from the liquid discharge head" includes the first liquid which is discharged actively and made to exit from the nozzles, and the first liquid which is forced to exit from the nozzles as in the suction purge or push purge.

The first liquid usable in the liquid discharge recording apparatus of the present teaching includes, for example, a water-based ink for ink-jet recording, a treatment solution (treatment liquid) used in the ink-jet recording, etc. The treatment liquid is a liquid which is discharged to a recording medium before or after the discharge of ink, for the purpose of improving the quality of image (image quality), etc. Further, the first liquid is not limited to a liquid to be used for ink-jet recording, and is exemplified by, for example, a shipping liquid (preservative liquid), an introductory liquid, an inspection liquid, etc. The shipping liquid is a liquid charged into a flow channel, of a liquid discharge recording apparatus, in a state of shipped out from the factory so as to preserve that state inside the flow channel. The introductory liquid is a liquid which is charged in advance into the flow channel of the liquid discharge recording apparatus after a liquid discharge head of the apparatus has been produced such that, when the ink is introduced into the flow channel in the factory, the ink is easily introduced into the flow channel. The inspection liquid is a liquid to be used for inspecting the discharge of the liquid discharge head in the factory. As described above, the first liquid contains the first 1,2-diol. It is allowable to prepare the first liquid or to use any commercially available liquid product which contains the first 1,2-diol.

According to the present teaching, it is possible to reduce the volatilization of the first 1,2-diol contained in the first liquid. Therefore, for example, it is possible to add a necessary and sufficient amount of the first 1,2-diol to an ink applied to the liquid discharge recording apparatus of the present teaching, thereby making it possible to improve the quick-drying property and the image quality as well. Further, 1,2-diol also has the surface-active property. Accordingly, the first liquid containing the necessary and sufficient amount of the first 1,2-diol can be easily introduced into the liquid discharge head and the flow channel of the liquid discharge recording apparatus. Note that the above-described effect obtained by the first 1,2-alkanediol contained in the first liquid cannot be obtained with any alkanediols different from 1,2-alkanediol such as, for example, 1,5-pentanediol, 1,6-hexanediol, etc. Further, the alkanediols different from 1,2-alkanediol have low vapor pressure lower than that of 1,2-alkanediol, in many cases. Thus, even if any of the alkanediols different from 1,2-alkanediol is contained in the first liquid, there is no task that is same as that of the present teaching and that is to suppress the volatilization of the alkanediol different from 1,2-alkanediol.

There is known the "coexistence effect" wherein a substance having a low vapor pressure is allowed to coexist with a substance having a high vapor pressure, thereby making it possible to volatilize the substance having the low vapor pressure. The present teaching views this "coexistence effect" from the opposite standpoint, and is based on a concept that the volatilization of the first 1,2-diol contained in the first liquid is reduced by allowing the absorber to contain the second liquid containing the second 1,2-diol of which vapor pressure is lower than that of the first 1,2-diol contained in the first liquid. The inventors of the present teaching were the first to obtain this concept. Base on the concept, the inventors of the present teaching found out that the volatilization of the first 1,2-diol contained in the first liquid can be reduced by absorbing the first liquid with the absorber containing the second liquid containing the second 1,2-diol of which vapor pressure is lower than that of the first 1,2-diol contained in the first liquid. Thus, according to the present teaching, it is possible to provide a liquid discharge recording apparatus and a liquid recovery method which are capable of reducing the generation of VOC. Note that since the vapor pressure depends on the temperature, the comparison between the vapor pressure of the first 1,2-diol and the vapor pressure of the second 1,2-diol in the specification of the present teaching is, naturally, performed by comparing the respective vapor pressures at a same temperature, and the comparison of the vapor pressures may be performed, for example, at 20 degrees Celsius. The method for causing the absorber to absorb the first liquid is not particularly limited; it is allowable, for example, to cause the absorber to absorb the first liquid by discharging the first liquid toward the absorber by a liquid discharge head such as an ink-jet head or to allow the absorber to absorb the first liquid sucked from the liquid discharge head by a suction pump, as will be described below.

In the liquid discharge recording apparatus of the present teaching, the first 1,2-diol contained in the first liquid is preferably a volatile 1,2-diol, and the second 1,2-diol contained in the second liquid contained in the absorber is preferably a non-volatile 1,2-diol. Each of the first and second 1,2-diols is not a solid insoluble to water, but has the solubility to water.

Note that it is possible to confirm whether 1,2-diol is volatile or non-volatile by, for example, the following method. Namely, at first, 5 g of 1,2-diol is poured into an open container (open vial, opening size (diameter): 20.2 mm). Then, the open vial is stored for one week at a temperature of 60 degrees Celsius and a relative humidity of 40%. After the storage, in a case that the evaporation rate of the 1,2-diol exceeded 5%, such 1,2-diol is judged to be volatile, and in a case that the evaporation rate of the 1,2-diol is not more than 5%, such 1,2-diol is judged to be non-volatile. TABLE 1 shows the results of volatility confirmation for representative 1,2-diols confirmed by this method.

TABLE 1

| 1,2-diol | 1,2-propanediol (1,2-PDO) | 1,2-butane diol (1,2-BDO) | 1,2-pentane diol (1,2-PeDO) | 1,2-hexane diol (1,2-HeDO) |
| --- | --- | --- | --- | --- |
| Vapor pressure (20° degrees Celsius) | 0.11 hPa | 0.10 hPa | 0.10 hpa | <0.01 hPa |
| Molecular weight | 76.1 | 90.1 | 104.2 | 118.2 |
| Boiling point (degrees Celsius) | 187.3 | 190.5 | 210.0 | 223.5 |
| Evaporation rate (%) | 61.0 | 47.2 | 38.6 | 4.3 |
| Results of confirmation | volatile | volatile | volatile | non-volatile |

The volatile 1,2-diol includes, for example, 1,2-propanediol (1,2-PDO), 1,2-butane diol (1,2-BDO), 1,2-pentane diol (1,2-PeDO), etc. The volatile 1,2-diol is preferably 1,2-PDO. It is allowable that only one kind of the above volatile 1,2-diols is contained in the first liquid, or that two or more kinds of the above volatile 1,2-diols are contained in the first liquid.

The non-volatile 1,2-diol includes, for example, 1,2-hexane diol (1,2-HeDO), 1,2-heptanol, 1,2-octanediol, 1,2-nonanediol, 1,2-decanediol, etc. It is allowable that only one kind of the above non-volatile 1,2-diols is contained in the second liquid, or that two or more kinds of the above non-volatile 1,2-diols are contained in the second liquid.

Note that since the carbon numbers of the 1,2-propanediol (1,2-PDO), 1,2-butane diol (1,2-BDO), 1,2-pentane diol (1,2-PeDO), 1,2-hexane diol (1,2-HeDO), 1,2-heptanol, 1,2-octanediol, 1,2-nonanediol and 1,2-decanediol increase in the order that these 1,2-diols are listed as above, the vapor pressures in these 1,2-diols lower also in the listed order.

It is preferable that each of the first and second 1,2-alkanediols is straight-chain alkanediol. The above-described effect viewing the "coexistence effect" from the opposite standpoint tends to easily occur between substances having similar chemical structures. Thus, in a case that each of the first and second 1,2-alkanediols is straight-chain alkanediol, it is possible to lower the volatilization of the first 1,2-alkanediol contained in the first liquid more effectively.

It is preferable that the carbon number of each of the first and second 1,2-alkanediols is 3 to 10. In a case that the carbon number of the first 1,2-alkanediol is not less than 3, the effects such as the realization of quick-drying property and improved image quality and also the effect of realizing easy introduction of the first liquid into the liquid discharge head, etc. are easily achieved; in a case that the carbon number of each of the first and second 1,2-alkanediols is not more than 10, the sufficient solubility of each of the first and second 1,2-alkanediols to water can be ensured.

The vapor pressure of 1,2-alkanediol tends to be lower as the carbon number of 1,2-alkanediol is great. Thus, it is preferable that the carbon number of the first 1,2-alkanediol is smaller than the carbon number of the second 1,2-alkanediol. It is further preferable that the carbon number of the first 1,2-alkanediol is 3 to 5 and that the carbon number of the second 1,2-alkanediol is 6 to 10.

In a case that the first liquid is an ink, at least one of a dye and a pigment may be added as a colorant to the first liquid. The blending amount of the colorant in the entire amount of the ink is not particularly limited, and may be appropriately determined based on, for example, desired optical density or color (hue, tint), etc. The blending amount of the colorant in the entire amount of the ink is, for example, in a range of 0.2% by weight to 20% by weight, and is preferably in a range of 2% by weight to 10% by weight. The blending amount of the first 1,2-diol in the entire amount of the ink is not particularly limited, and is, for example, in a range of 0.5% by weight to 15% by weight, is preferably in a range of 1% by weight to 10% by weight, and is more preferably in a range of 2% by weight to 5% by weight. The ink may further contain any other conventionally known additive(s) exemplified by surfactants, rust-preventing agents, fungicides, etc., as necessary.

In a case that the first liquid is an introductory liquid, the blending amount of the first 1,2-diol in the entire amount of the introductory liquid is not particularly limited, and is preferably in a range of 2% by weight to 30% by weight, in view of the introductory performance of the introductory liquid, and is more preferably in a range of 5% by weight to 15% by weight.

In a case that the first liquid is a shipping liquid (preservative liquid), the blending amount of the first 1,2-diol in the entire amount of the shipping liquid is not particularly limited, and is, for example, in a range of 0.5% by weight to 10% by weight, is preferably in a range of 1% by weight to 7.5% by weight, and is more preferably in a range of 2% by weight to 5% by weight.

In a case that the first liquid is an inspection liquid, the blending amount of the first 1,2-diol in the entire amount of the inspection liquid is not particularly limited, and is, for example, in a range of 1% by weight to 20% by weight, is preferably in a range of 2% by weight to 15% by weight, and is more preferably in a range of 5% by weight to 10% by weight. The inspection liquid may contain a colorant similar to the colorant contained in the ink.

In a case that the first liquid is a liquid different from the ink, such as the introductory liquid, preservative liquid (shipping liquid), inspection liquid, etc., it is allowable that the first liquid does not contain any colorant, or that the first liquid contains a colorant so that the presence of the first liquid can be visually confirmed. In a case that the first liquid which is different from the ink contains a colorant, the blending amount of the colorant in the first liquid is preferably not more than 0.5% by weight.

In the liquid discharge recording apparatus of the present teaching, the absorber which absorbs the first liquid exited from the liquid discharge head may be any absorber provided that the absorber is capable of absorbing the first liquid. For example, the absorber is exemplified by melamine foam, urethane foam, polyethylene foam, silicone foam, acrylic foam, chloroprene rubber (CR) sponge, natural rubber (NR) sponge, nitrile rubber (NBR) sponge, ethylene propylene diene rubber (EPDM) sponge, felt foam, needle felt among which melamine foam is preferable.

The second 1,2-alkanediol in the second liquid contained in the absorber may be any 1,2-alkanediol provided that the vapor pressure of such 1,2-alkanediol is lower than the vapor pressure of the first 1,2-alkanediol. It is preferable, however, that the second 1,2-alkanediol is non-volatile 1,2-alkanediol as described above. Further, it is allowable that the second 1,2-alkanediol is composed substantially only of non-volatile 1,2-alkanediol and does not contain any volatile 1,2-alkanediol. Even in a case that the absorber contains any volatile 1,2-alkanediol, the ratio of the non-volatile 1,2-alkanediol to the entire amount of 1,2-alkanediols contained in the absorber is preferably not less than 95% by weight.

It is preferable that the second liquid is composed only of the second 1,2-alkanediol, or that the second liquid contains another solvent, such as water, that is different from the second 1,2-alkanediol. The second liquid may be an aqueous solution of the second 1,2-alkanediol. The water is preferably ion exchange water or pure water (purified water). In view of reducing the volatilization of the first 1,2-alkanediol, the blending amount of the second 1,2-alkanediol in the second liquid is preferably, for example, in a range of 20% by weight to 100% by weight, is more preferably in a range of 50% by weight to 100% by weight, and is further more preferably in a range of 80% by weight to 100% by weight. Further, in view of reducing the volatilization of the first 1,2-alkanediol, the blending ratio (% by weight) of the second 1,2-alkanediol in the second liquid is preferably not less than 2.5 times, is more preferably in a range of 2.5 times to 10 times the blending ratio (% by weight) of the first 1,2-alkanediol in the first liquid.

Next, a liquid discharge recording apparatus and a liquid recovery method of the present teaching will be specifically explained. The liquid discharge recording apparatus of the present teaching includes a liquid discharge head which discharges the first liquid and an absorber which absorbs the first liquid exited from the liquid discharge head. The absorber is preferably at least one of a flushing absorber, a waste liquid absorber and a platen absorber, wherein the flushing absorber is arranged in a non-recording area of the liquid discharge recording apparatus, the waste liquid absorber directly or indirectly absorbs the first liquid exited from the liquid discharge head and stores the first liquid therein, and the platen absorber is arranged in a recording area of the liquid discharge recording apparatus. In the liquid discharge recording apparatus of the present teaching, the configuration of the liquid discharge recording apparatus, except for the absorber, may be similar to that of a conventional liquid discharge recording apparatus such as an ink-jet recording apparatus. The liquid recovery method of the present teaching is practiced by using the liquid discharge recording apparatus of the present teaching.

FIG. 1 shows the configuration of an example of the liquid discharge recording apparatus of the present teaching. As shown in FIG. 1, a liquid discharge recording apparatus 1 of the present teaching includes a platen 2, a carriage 3, an ink-jet head (liquid discharge head) 4, a transporting mechanism 5 and a maintenance unit 6 as main constitutive components or parts. The ink-jet head 4 may be of any system including the piezoelectric element system, the thermal ink-jet system, the electrostatic attraction system, etc.

A recording medium (for example, recording paper or recording sheet) P supplied from a paper feeding mechanism (not shown in the drawings) is placed on the upper surface of the platen 2. Two guide rails 10 and 11 are arranged at a position above or over the platen 2, and extend parallel to each other in the scanning direction (left/right direction in FIG. 1). The carriage 3 is movable in a reciprocating manner in the scanning direction along the two guide rails 10 and 11 in an area at which the carriage 3 faces or is opposite to the platen 2.

The two guide rails 10 and 11 extend in the scanning direction to further protrude from the left and right ends of the platen 2. The carriage 3 is configured to be movable from the area facing the recording paper P on the platen 2 (recording area) to a position located away from both of the left/right ends of the platen 2 (non-recording area). An endless belt 14 wound between two pulleys 12 and 13 is connected to the carriage 3. By driving the endless belt 14 to run by a carriage driving motor 15, the carriage 3 is reciprocated in the scanning direction, accompanying with the running of the endless belt 14.

The ink-jet head 4 is installed in a lower portion of the carriage 3. The lower surface of the ink-jet head 4 is a liquid discharge surface 4a (see FIG. 2) which is parallel to the upper surface of the platen 2 and in which a plurality of nozzles 16 are opened. The first liquid (ink) is discharged from the plurality of nozzles 16 of the liquid discharge surface 4a toward the recording paper P placed on the platen 2 so as to perform recording on the recording paper P.

Four ink supply ports (not shown in the drawings) corresponding to colors of black, yellow, cyan and magenta, respectively are provided on the upper surface of the ink-jet head 4, and one ends of four tubes 17 are connected to the four ink supply ports, respectively. The other ends of the four tubes 17 are connected to a cartridge installation section 9 that is configured such that four ink cartridges 8 storing the four color inks respectively are detachably attached to the cartridge installation section 9. With this configuration, the inks of the respective four colors are supplied to the ink-jet head 4 from the four ink cartridges 8 installed in the cartridge installation section 9 via the four tubes 17, respectively.

The transporting mechanism 5 has two transporting rollers 18 and 19 which are arranged so as to sandwich the platen 2 therebetween in a transporting direction (direction from the upper portion to the lower portion on the sheet surface in FIG. 1). The recording paper P placed on the platen 2 is transported in the transporting direction by the two transporting rollers 18 and 19.

The liquid discharge recording apparatus 1 discharges the first liquid from the ink-jet head 4 installed in the carriage 3 toward the recording paper P placed on the platen 2 and transports the recording paper P in the transporting direction by the two transporting rollers 18 and 19, thereby recording desired image and/or letter, etc., on the recording paper P.

Next, the maintenance unit 6 will be explained. The maintenance unit 6 includes a purge unit and a flushing unit. The purge unit has a waste liquid absorber 22, a suction cap 21 and a suction pump 23 which are arranged on one side in the scanning direction (on the right side in FIG. 1) with respect to the platen 2. The flushing unit is arranged on the other side in the scanning direction (on the left side in FIG. 1) with respect to the platen 2, and includes a first flushing absorber 53, a second flushing absorber 54, a waste liquid tank 50 and a liquid receiving member 51, as main constitutive components or parts.

The suction cap 21 is driven by a cap driving mechanism including a driving mechanism such as a motor (not shown) so that the suction cap 21 is driven to move in the up and down direction and to make approach/separation with respect to the liquid discharge surface 4a. The suction pump 23 is connected to the suction cap 21. When the suction cap 21 makes contact with the liquid discharge surface 4a, the suction cap 21 covers the openings of the plurality of nozzles 16. In a case that the suction cap 21 is in a capping state in such a manner, the suction pump 23 is driven to perform suction and depressurization in the inside of the suction cap 21, thereby causing the first liquid to exit from all of the nozzles 16 covered by the suction cap 21 (suction purge). The suction pump 23 is connected to the waste liquid absorber 22. The first liquid sucked and made to exit from the nozzles 16 by the suction purge is absorbed by the waste liquid absorber 22 via the suction pump 23. Although not shown in the drawings, the waste liquid absorber 22 is accommodated in a box which is open at an upper portion of the box. The waste liquid absorber 22 may be any member provided that such a member is capable of absorbing the first liquid, such as, for example, a melamine foam, etc. In the embodiment, the purge unit is configured to suck the first liquid from the nozzles 16 by the suction pump 23. However, the purge unit may be configured as a so-called "push purge" mechanism which applies pressure to the first liquid inside the ink-jet head 4 to thereby cause the first liquid to exit from the nozzles 16. Namely, the first liquid absorbed by the absorber in the present teaching may be the first liquid which is discharged actively and made to exit from the nozzles, or the first liquid which is forced to exit from the nozzles as in the suction purge. Alternatively, in the present teaching, it is allowable to provide such an aspect wherein the absorber receives the first liquid discharged directly to the absorber, or another aspect wherein the absorber, such as the waste liquid absorber 22, receives the first liquid indirectly, e.g. the first liquid fed from the suction pump 23, etc. to the absorber.

Figure 2:
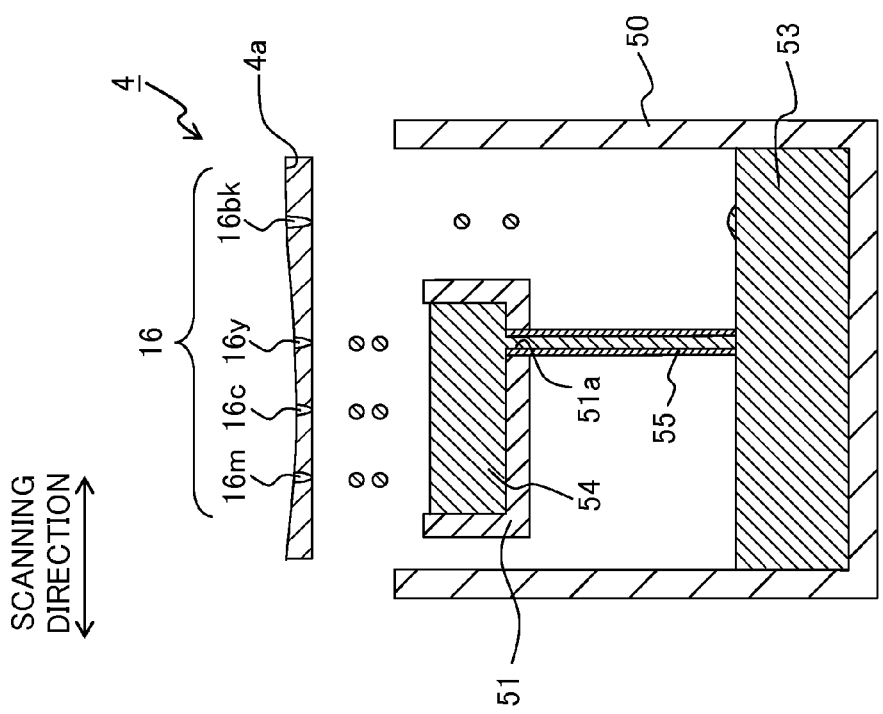
FIG. 2 is a cross-sectional view of a waste liquid tank in a vertical plane including the scanning direction when the liquid discharge recording apparatus shown in FIG. 1 performs liquid recovery operation.

As shown in FIG. 2, the waste liquid tank 50 has a box-shape which is open at an upper portion thereof, and accommodates the first flushing absorber 53 inside of the waste liquid tank 50. The liquid receiving member 51 is arranged at a position above or over the first flushing absorber 53. The liquid receiving member 51 has a box-shape which is open at an upper portion thereof, and accommodates the second flushing absorber 54 inside of the liquid receiving member 51. A discharge port 51a is formed in the liquid receiving member 51 at a portion on the bottom surface and located on one side in the scanning direction (on the right side in FIG. 2). The discharge port 51a is connected to one end of a tube 55 of which other end makes contact with the upper surface of the first flushing absorber 53. With this, the first liquid absorbed by the upper surface of the second flushing absorber 54 moves downwardly and is discharged from the discharge port 51a to the first flushing absorber 53, via the tube 55. Each of the first and second flushing absorbers 53 and 54 may be any member provided that such a member is capable of absorbing the first liquid, such as, for example, a melamine foam, etc.

Next, a platen absorber 60 will be explained with reference to FIGS. 3A and 3B. FIG. 3A is a plane view of the platen 2 and the platen absorber 60, and FIG. 3B is a cross-sectional view of the platen 2 and the platen absorber 60 in the vertical plane including the scanning direction when the liquid is being recovered (during a liquid recovery operation). Note that in FIG. 3A, the recording paper P is depicted by broken lines, and the lower portion of the recording paper P is depicted in phantom. As shown in FIGS. 3A and 3B, a platen absorber 60 having a rectangular cylindrical shape is integrated into the platen 2 at a lower portion of an area in which an end or edge portion of the recording paper P passes. With this, in case of performing for example a borderless recording with respect to the recording paper P, it is possible to absorb, with the platen absorber 60, the first liquid discharged onto the upper surface of the platen 2 beyond the end portion of the recording paper P. The platen absorber 60 may be any member provided that such a member is capable of absorbing the first liquid, such as, for example, a melamine foam, etc. Further, the shape of the platen absorber 60 is not limited to the shape of rectangular cylindrical shape shown in FIGS. 3A and 3B, and the platen absorber 60 may have any shape provided that the platen absorber 60 is capable of absorbing the first liquid discharged beyond the end portion of the recording paper P.

The first flushing absorber 53, the second flushing absorber 54, the waste liquid absorber 22 and the platen absorber 60 contain the second liquid containing the second 1,2-diol of which vapor pressure is lower than the vapor pressure of the first 1,2-diol contained in the first liquid. In each of the first and second flushing absorbers 53 and 54 and the platen absorber 60, the second liquid containing the second 1,2-diol may be contained only at a portion which makes contact with the first liquid discharged from the ink-jet head 4, or may be contained in the entirety of each of the first and second flushing absorbers 53 and 54 and the platen absorber 60. Further, each of the first flushing absorber 53, the second flushing absorber 54, and the platen absorber 60 may be provided independently (separately) respectively for the colors of the first liquids (inks) discharged from the ink-jet head 4. In such a case, the content amounts of the second 1,2-diol contained in each of the first flushing absorber 53, the second flushing absorber 54, and the platen absorber 60 may be determined depending on the content amount of the first 1,2-diol contained in one of the discharged first liquids.

Next, an example of the liquid recovery method of the present teaching will be explained with reference to FIG. 2. The example shown in FIG. 2 is an aspect wherein the first liquid is recovered by discharging the first liquid from the ink-jet head 4 directly to the flushing absorber. FIG. 2 is a cross-sectional view of the waste liquid tank 50 in a vertical plane including the scanning direction when the liquid discharge recording apparatus 1 shown in FIG. 1 performs liquid recovery operation. In FIG. 2, reference numerals "16bk", "16y", "16c" and "16m" indicate nozzles 16 for the black, yellow, cyan and magenta inks, respectively. In the liquid discharge recording apparatus 1, the ink-jet head 4 may further have a nozzle and a supply port for a treatment liquid. The liquid discharge recording apparatus 1 may further have a cartridge in which the treatment liquid is stored and a tube for supplying the treatment liquid.

When the liquid is recovered in this example, the ink-jet head 4 is stopped, without scanning in the scanning direction, and the inks discharged from the nozzles 16 are discharged immediately downwardly. FIG. 2 shows an example wherein liquid recovery for recovering the black ink from the nozzle 16bk and liquid recovery for recovering the three color inks that are yellow, cyan and magenta inks from the nozzles 16y, 16c and 16m are performed at the same time. A timing for discharging the inks is exemplified by a timing before starting the recording on recording paper P, a timing between the paper sheets during a continuous recording (from a point of time after completing recording on one sheet of the recording paper P and until a point of time starting the recording on next sheet of the recording paper P), etc. Further, in a case that the first liquid is the shipping liquid charged into a flow channel and the ink-jet head 4, the shipping liquid is discharged from the ink-jet head 4 by a purge performed by the purge unit before the liquid used for the ink-jet recording and including the ink and the treatment liquid, etc., is introduced into the flow channel, and then the shipping liquid is recovered to the waste liquid absorber 22 (is recovered by being absorbed in the waste liquid absorber 22).

In FIG. 2, the first liquids (inks) are recovered by discharging the inks of the respective colors that are the black ink and the three color inks that area yellow, cyan and magenta inks from the nozzle 16bk of the black ink and the nozzles 16y, 16c and 16m of the three color inks toward the first flushing absorber 53 accommodated in the waste liquid tank 50 and the second flushing absorber 54 accommodated in the liquid receiving member 51, respectively, at a position at which the nozzle 16bk of the black ink is made to face or to be opposite to the first flushing absorber 53, and at which the nozzles 16y, 16c and 16m of the three color inks are made to face the second flushing absorber 54. Note that the liquid recovery of the liquid from the nozzle 16bk of the black ink and the liquid recovery of the liquids from the nozzles 16y, 16m, and 16c of the three color inks may be performed separately from each other. Further, in a case that the ink-jet head 4 has the nozzle for the treatment liquid, liquid recovery of the treatment liquid from the nozzle for the treatment liquid can also be performed by moving the nozzle for the treatment liquid to a position facing or to be opposite to the first or second flushing absorber 53 or 54, in a similar manner as for the recovery of the inks. The maximum amount of the second liquid contained in the first and second flushing absorbers 53 and 54 is preferably not more than 0.91 µg/mm$^3$, and is more preferably not more than 0.7 µg/mm$^3$, in view of preventing any liquid leakage (dripping) from the absorbers. In a case that the second liquid contains 25% by weight to 100% by weight of the non-volatile 1,2-diol, the minimum amount of the second liquid contained in the first and second flushing absorbers 53 and 54 is preferably not less than 0.02 µg/mm$^3$ and is more preferably not less than 0.04 µg/mm$^3$, in view of sufficiently suppressing the volatilization of the first 1,2-diol contained in the first liquid; in a case that the second liquid contains 50% by weight to 100% by weight of the non-volatile 1,2-diol, the minimum amount of the second liquid contained in the first and second flushing absorbers 53 and 54 is preferably not less than 0.01 µg/mm$^3$ and is more preferably not less than 0.02 µg/mm$^3$.

Furthermore, the amount of the second 1,2-diol in the second liquid contained in the absorber may be determined depending on, for example, the amount of the first 1,2-diol contained in the first liquid, the period of service life or lifetime of the liquid discharge recording apparatus, etc. For example, in a case that the absorber is the flushing absorber of the liquid discharge recording apparatus, the amount of the second 1,2-diol in the second liquid contained in the flushing absorber is preferably not less than 0.10 g, is more preferably not less than 0.18 g, is preferably not more than 0.81 g, and is more preferably not more than 0.63 g.

The second liquid, containing the second 1,2-diol, of which vapor pressure is lower than that of the first 1,2-diol contained in the first liquid, is contained in the first and second flushing absorbers 53 and 54. Therefore, it is possible to reduce the volatilization of the first 1,2-diol contained in the first liquid by the above-described mechanism viewing the "coexistence effect" from the opposite standpoint.

Next, another example of the liquid recovery method of the present teaching will be explained with reference to FIG. 1. As described above, in the liquid discharge recording apparatus 1 shown in FIG. 1, the first liquid (ink) sucked and made to exit by the suction purge is absorbed by the waste liquid absorber 22 via the suction pump 23. The maximum amount of the second liquid contained in the waste liquid absorber 22 is preferably not more than 0.91 µg/mm$^3$. In a case that the second liquid contains 25% by weight to 100% by weight of the non-volatile 1,2-diol, the minimum amount of the second liquid contained in the waste liquid absorber 22 is preferably not less than 0.1 µg/mm$^3$ and is more preferably not less than 0.2 µg/mm$^3$; in a case that the second liquid contains 50% by weight to 100% by weight of the non-volatile 1,2-diol, the minimum amount of the second liquid contained in the waste liquid absorber 22 is preferably not less than 0.05 µg/mm$^3$ and is more preferably not less than 0.5 µg/mm$^3$. Since the waste liquid absorber 22 also contains the second liquid containing the second 1,2-diol of which vapor pressure is lower than that of the first 1,2-diol contained in the first liquid, it is possible to reduce the volatilization of the first 1,2-diol contained in the first liquid by the above-described mechanism viewing the "coexistence effect" from the opposite standpoint. In such a manner, the present teaching is applicable also to an aspect wherein the first liquid discharged from the ink-jet head 4 is absorbed by the waste liquid absorber 22 via the suction pump 23, without being limited only to the case that the first liquid discharged from the ink-jet head 4 is directly absorbed.

Next, still another example of the liquid recovery method of the present teaching will be explained with reference to FIG. 3B. The example shown in FIG. 3B is an aspect wherein the first liquid is recovered by discharging the first liquid from the ink-jet head 4 directly to the platen absorber 60. In FIG. 3B, same parts or portions as those in FIG. 2 are assigned with same reference numerals as those in FIG. 2.

When the liquid is recovered in this example, the ink-jet head 4 is stopped, without scanning in the scanning direction, and the ink(s) discharged from the nozzles 16 are discharged immediately downwardly. FIG. 3B shows an example wherein the liquid (first liquid) is recovered from the nozzle 16m for the magenta ink.

In FIG. 3B, the first liquid (magenta ink) is recovered by discharging the magenta ink from the nozzle 16m of the magenta ink toward the platen absorber 60 integrated into the platen 2, at a position at which the nozzle 16m is made to face or to be opposite to the platen absorber 60. Note that the recovery of the first liquids from the nozzles 16bk, 16y and 16c can also be performed by moving the nozzles 16bk, 16y and 16c to positions at each of which one of the nozzles 16bk, 16y and 16c faces the platen absorber 60, in a similar manner as for the recovery of the magenta ink from the nozzle 16m. Further, in a case that the ink-jet head 4 has the nozzle for the treatment liquid, liquid recovery of the treatment liquid from the nozzle for the treatment liquid can also be performed by moving the nozzle for the treatment liquid to a position facing or to be opposite to the platen absorber 60, in a similar manner as for the recovery of the ink(s). The maximum amount of the second liquid contained in the platen absorber 60 is preferably not more than 0.91 µg/mm³.

The second liquid containing the second 1,2-diol, of which vapor pressure is lower than that of the first 1,2-diol contained in the first liquid, is contained in the platen absorber 60. Therefore, it is possible to reduce the volatilization of the first 1,2-diol contained in the first liquid by the above-described mechanism viewing the "coexistence effect" from the opposite standpoint.

As described above, according to the present teaching, it is possible to reduce the volatilization of the first 1,2-alkanediol contained in the first liquid, by causing the absorber, which contains the second liquid containing the second 1,2-alkanediol of which vapor pressure is lower than that of the first 1,2-alkanediol contained in the first liquid, to absorb the first liquid exited from the liquid discharge head.

EXAMPLES

Next, examples of the present teaching will be explained together with comparative examples. Note that the present teaching is not limited and is not restricted to the examples and the comparative examples which will be described below.

Examples 1-7 and Comparative Examples 1-5

A melamine foam (surface area: 1 cm², thickness: 5 mm) was placed in a vial bottle for HS-GC/MS (Head Space-Gas Chromatography/Mass Spectrometry) measurement. Next, 100 µL of an ink was permeated into the melamine foam and was kept at a temperature of 60 degrees Celsius for 30 minutes. As the ink, each of three kinds of inks having compositions shown in TABLE 2 as follows was used. In TABLE 2, the pigment dispersant is CAB-O-JET (trade name) 300 produced by Cabot Corporation; and the surfactant is OLFINE (trade name) E1010 produced by Nissin Chemical Industry Co., Ltd. After the temperature keeping, gas was supplied from the vial bottle to the GS/MS for 0.05 minutes and the measurement was performed. Thus, the total of the peak areas of the 1,2-diols contained in the inks were calculated. Further, the melamine foam was placed in a vial bottle for the HS-GC/MS measurement. Next, 100 µL of each of 1,2-diols (a 100% by weight 1,2-diol-aqueous solution) as measurement objectives was permeated into the melamine foam, and then 100 µL of one of the inks was permeated into the melamine foam. Thus, the total of the peak areas of the 1,2-diols contained in the inks were calculated, in a similar manner as described above. Note that in Example 6, a 50% by weight 1,2-diol-aqueous solution of the 1,2-diol as measurement objective was used; in Example 7, a 25% by weight 1,2-diol-aqueous solution of the 1,2-diol as measurement objective was used; in Comparative Example 1, glycerol (GLY) was used; in Comparative Example 2, triethylene glycol (TEG) was used; and in Comparative Example 3, triethylene glycol butyl ether (TEB) was used.

Furthermore, the reduction rate of the volatilization amount of the 1,2-diol contained in the ink was calculated for each of the examples and the comparative examples by the following formula. With such a model experiment, the degree of suppressing the volatilization by the combination of the 1,2-diol contained in the ink and the compound permeated in the melamine foam was confirmed.

Reduction Rate(%)=$\{(X-Y)/X\} \times 100$ wherein in the formula,
X: Total of the peak areas in the ink itself
Y: Total of the peak areas in a case that the compound as the measurement objective was permeated in the melamine foam.

TABLE 2

| | | INKS | | |
|---|---|---|---|---|
| | | Ink 1 | Ink 2 | Ink 3 |
| Ink Composition (unit: % by weight) | Pigment dispersant (10% aqueous solution) | 60.0 | 60.0 | 60.0 |
| | Glycerol | 4.0 | 4.0 | 4.0 |
| | Triethylene glycol | 4.0 | 4.0 | 4.0 |
| | Diethylene glycol | 4.0 | 4.0 | 4.0 |
| | 1,2-PDO | 10.0 | — | — |
| | 1,2-BDO | — | 10.0 | — |
| | 1,2-PeDO | — | — | 10.0 |
| | Surfactant | 0.4 | 0.4 | 0.4 |
| | Water | balance | balance | balance |

The results of measurement of Examples 1-7 and Comparative Examples 1-5 are shown in TABLE 3 and TABLE 4 as follows.

TABLE 3

| | EXAMPLES | | | | | | |
|---|---|---|---|---|---|---|---|
| | EX. 1 | EX. 2 | EX. 3 | EX. 4 | EX. 5 | EX. 6 | EX. 7 |
| Ink | Ink 1 | Ink 1 | Ink 1 | Ink 2 | Ink 3 | Ink 1 | Ink 1 |
| 1,2-diol contained in the ink | 1,2-PDO | 1,2-PDO | 1,2-PDO | 1,2-BDO | 1,2-PeDO | 1,2-PDO | 1,2-PDO |
| Vapor pressure (hPa-20 degrees Celsius) | 0.11 | 0.11 | 0.11 | 0.10 | 0.10 | 0.11 | 0.11 |
| 1,2-diol permeated in the melamine foam | 1,2-BDO | 1,2-PeDO | 1,2-HeDO | 1,2-HeDO | 1,2-HeDO | 1,2-HeDO (*1) | 1,2-HeDO (*2) |
| Vapor pressure (hPa-20 degrees Celsius) | 0.10 | 0.10 | <0.01 | <0.01 | <0.01 | <0.01 | <0.01 |
| Reduction rate (%) | 23 | 39 | 82 | 74 | 70 | 70 | 45 |

*1: 50% by weight aqueous solution
*2: 25% by weight aqueous solution

TABLE 4

| | COMPARATIVE EXAMPLES | | | | |
|---|---|---|---|---|---|
| | COM. EX.1 | COM. EX. 2 | COM. EX. 3 | COM. EX. 4 | COM. EX. 5 |
| Ink | Ink 1 | Ink 1 | Ink 1 | Ink 2 | Ink 3 |
| 1,2-diol contained in the ink | 1,2-PDO | 1,2-PDO | 1,2-PDO | 1,2-BDO | 1,2-PeDO |
| Vapor pressure (hPa-20 degrees Celsius) | 0.11 | 0.11 | 0.11 | 0.10 | 0.10 |
| Compound permeated in the melamine foam | GLY | TEG | TEB | 1,2-PDO | 1,2-PDO |
| Vapor pressure (hPa-20 degrees Celsius) | <0.01 | <0.01 | <0.01 | 0.11 | 0.11 |
| Reduction rate (%) | 2 | 1 | 9 | −1 | −3 |

As shown in TABLE 3, in Examples 1-7 wherein 1,2-diol of which vapor pressure was lower than that of 1,2-diol contained in the ink was permeated in the melamine foam, the reduction rate was not less than 20% and the volatilization of the 1,2-diol contained in the ink was lowered. In Examples 3 to 6 wherein volatile 1,2-diol was permeated in the ink and non-volatile 1,2-diol was permeated in the melamine foam, the reduction rate was not less than 50% and the volatilization of the 1,2-diol contained in the ink was further lowered. In particular, in Example 3 wherein 1,2-PDO was permeated in the ink and 1,2-HeDO was permeated in the melamine foam, the reduction rate was not less than 80% and the volatilization of the 1,2-diol contained in the ink was furthermore lowered.

On the other hand, in each of Comparative Examples 1-3 wherein the compound different from the 1,2-diol was contained (permeated) in the melamine foam, and in Comparative Examples 4 and 5 wherein 1,2-diol of which vapor pressure is higher than that of 1,2-diol contained in the ink was permeated in the melamine foam, the reduction rate was less than 10% and the 1,2-diol contained in the ink was volatilized.

As described above, the liquid discharge recording apparatus of the present teaching is capable of reducing the generation of VOC. The usage of the liquid discharge recording apparatus of the present teaching is not particularly limited, and is widely applicable to a variety of kinds of ink-jet recording.

What is claimed is:

1. A liquid discharge recording apparatus comprising:
   a first liquid containing first 1,2-alkanediol;
   a liquid discharge head configured to discharge the first liquid;
   a second liquid containing second 1,2-alkanediol of which vapor pressure is lower than that of the first 1,2-alkanediol; and
   an absorber which contains the second liquid and which is configured to absorb the first liquid exited from the liquid discharge head.

2. The liquid discharge recording apparatus according to claim 1, wherein the first 1,2-alkanediol is volatile 1,2-alkanediol, and the second 1,2-alkanediol is non-volatile 1,2-alkanediol.

3. The liquid discharge recording apparatus according to claim 2, wherein the volatile 1,2-alkanediol includes at least one selected from the group consisting of: 1,2-propanediol, 1,2-butanediol and 1,2-pentanediol; and
   the non-volatile 1,2-alkanediol includes 1,2-hexanediol.

4. The liquid discharge recording apparatus according to claim 2, wherein the volatile 1,2-alkanediol includes 1,2-propanediol; and
   the non-volatile 1,2-alkanediol includes 1,2-hexanediol.

5. The liquid discharge recording apparatus according to claim 1, wherein each of the first and second 1,2-alkanediols is straight-chain alkanediol.

6. The liquid discharge recording apparatus according to claim 1, wherein carbon number of each of the first and second 1,2-alkanediols is 3 to 10.

7. The liquid discharge recording apparatus according to claim 1, wherein carbon number of the first 1,2-alkanediol is smaller than carbon number of the second 1,2-alkanediol.

8. The liquid discharge recording apparatus according to claim 7, wherein the carbon number of the first 1,2-alkanediol is 3 to 5 and the carbon number of the second 1,2-alkanediol is 6 to 10.

9. The liquid discharge recording apparatus according to claim 1, wherein 20% by weight to 100% by weight of the second 1,2-alkanediol is contained in the second liquid.

10. The liquid discharge recording apparatus according to claim 1, wherein the second liquid is composed only of the second 1,2-alkanediol.

11. The liquid discharge recording apparatus according to claim 1, wherein the second liquid is an aqueous solution of the second 1,2-alkanediol.

12. The liquid discharge recording apparatus according to claim 1, wherein a blending ratio of the second 1,2-alkanediol in the second liquid is not less than 2.5 times a blending ratio of the first 1,2-alkanediol in the first liquid.

13. The liquid discharge recording apparatus according to claim 12, wherein a blending ratio of the second 1,2-alkanediol in the second liquid is in a range of 2.5 times to 10 times a blending ratio of the first 1,2-alkanediol in the first liquid.

14. The liquid discharge recording apparatus according to claim 1, wherein the absorber is at least one selected from the group consisting of a flushing absorber, a waste liquid absorber and a platen absorber;
the flushing absorber is arranged in a non-recording area of the liquid discharge recording apparatus, and is configured to receive the first liquid which the liquid discharge head discharges therefrom at a position at which the liquid discharge head faces the flushing absorber; and
the platen absorber is arranged in a recording area of the liquid discharge recording apparatus, and is configured to receive the first liquid which the liquid discharge head discharges therefrom at a position at which the liquid discharge head faces the platen absorber.

15. The liquid discharge recording apparatus according to claim 1, wherein an amount of the second liquid contained per 1 mm$^3$ of the absorber is not more than 0.91 µg/mm$^3$.

16. The liquid discharge recording apparatus according to claim 1, wherein the absorber is a melamine foam.

17. The liquid discharge recording apparatus according to claim 1, wherein the first liquid is a water-based ink.

18. A liquid-recovery method for recovering a liquid in a liquid discharge recording apparatus, the method comprising:
causing a first liquid containing first 1,2-alkanediol to exit from a liquid discharge head of the liquid discharge recording apparatus; and
recovering the first liquid by absorbing the first liquid exited from the liquid discharge head with an absorber which is provided in the liquid discharge recording apparatus and which contains a second liquid containing second 1,2-alkanediol having lower vapor pressure than that of the first 1,2-alkanediol.

19. The liquid-recovery method according to claim 18, wherein the first liquid is discharged from the liquid discharge head directly to the absorber.

\* \* \* \* \*